United States Patent [19]

Truong

[11] Patent Number: 5,087,643

[45] Date of Patent: Feb. 11, 1992

[54] CHEMICALLY STABLE ANAEROBIC ACRYLIC ADHESIVE FORMULATION

[75] Inventor: Dinh Nguyen Truong, Pau, France

[73] Assignee: Societe Nationale Elf Aquitaine, Courbevoie, France

[21] Appl. No.: 415,303

[22] PCT Filed: Dec. 21, 1988

[86] PCT No.: PCT/FR88/00628

§ 371 Date: Oct. 10, 1989

§ 102(e) Date: Oct. 10, 1989

[87] PCT Pub. No.: WO89/05841

PCT Pub. Date: Jun. 29, 1989

[30] Foreign Application Priority Data

Dec. 22, 1987 [FR] France ................... 87 17907

[51] Int. Cl.$^5$ ............. C08F 299/00; C08G 59/14
[52] U.S. Cl. .................... 523/176; 525/455; 525/502; 525/532
[58] Field of Search ........... 523/176; 525/455, 502, 525/532

[56] References Cited

U.S. PATENT DOCUMENTS

| 4,408,023 | 10/1983 | Gould et al. | 525/455 |
| 4,533,446 | 8/1985 | Conway et al. | 523/176 |
| 4,755,571 | 7/1988 | Irving et al. | 523/176 |
| 4,929,660 | 5/1990 | Chen | 523/176 |

Primary Examiner—Melvyn I. Marquis
Assistant Examiner—Thomas Hamilton, III
Attorney, Agent, or Firm—Burgess, Ryan & Wayne

[57] ABSTRACT

An anaerobic adhesive formulation is provided comprised of a monomeric acrylic phase consisting of 50 to 100 wt.% of one or more pluriacrylic esters and 50 to 0 wt.% of at least one unsaturated monomer chosen from the acrylic monomers and the non-acrylic unsaturated monomers and a system which produces free radicals and is inhibited in the presence of oxygen. The formulation also contains an additive for improving the impact strength and shear strength, consisting of a polyurethane performed or formed in situ and/or a heat stabilizing additive consisting of at least one epoxide resin associated with a latent hardener of said resin. The formulation is useful in anaerobic bonding.

37 Claims, No Drawings

CHEMICALLY STABLE ANAEROBIC ACRYLIC ADHESIVE FORMULATION

FIELD OF THE INVENTION

The invention relates to a single-component anaerobic acrylic adhesive formulation which is chemically stable and which is capable of producing a cured adhesive joint exhibiting improved impact and shear strengths or/and a good thermal behaviour.

BACKGROUND OF THE INVENTION

Anaerobic acrylic adhesive formulations are mixtures based on acrylic esters capable of being polymerized by a radical route and consisting predominantly of multiacrylic esters and chemical generators of free radicals chosen from peroxy compounds, the said mixtures having a cure which is inhibited by oxygen.

These anaerobic formulations remain in the uncured state as long as they are in contact with atmospheric oxygen. On the other hand, when they are placed between metal surfaces or other surfaces which are impervious to atmospheric oxygen, the absence of contact with oxygen leads rapidly to their curing.

Anaerobic adhesive formulations of this kind are employed in various fields of industry, for producing seals or assemblies and especially for locking nuts.

Despite their growing use, anaerobic acrylic adhesive formulations still exhibit certain disadvantages. First of all, their chemical stability still remains insufficient because of the fact that, in the majority of cases it is necessary to incorporate latent accelerators of radical polymerization in these formulations in order to increase the rate of polymerization of the acrylic monomers once the said polymerization has been initiated by the free-radical generator. The presence of these ingredients in the anaerobic formulation can result in an undesirable curing of the said formulation before its use and, for example, during its storage. The incorporation of polymerization inhibitors, for example of compounds of the hydroquinone type, in the formulation reduces this risk of premature curing, but does not enable it to be eliminated altogether.

In addition, since the acrylic monomers present in the anaerobic formulations are predominantly multiacrylic esters whose polymerization produces a very compact polymeric network, the adhesive joints obtained after curing the said formulations exhibit an excessive mechanical rigidity and hence an inadequate resistance to impact and to peeling forces. Furthermore, anaerobic adhesive formulations have a thermal stability which is not satisfactory in most cases. Finally, the said formulations are highly fluid and this rules out the possibility of employing them for applications requiring the use of highly thickened adhesive formulations, especially adhesive bonding of large flat metal surfaces.

The objective of the invention is to provide a single-component anaerobic acrylic adhesive formulation which makes it possible to overcome the disadvantages of the corresponding earlier formulations.

SUMMARY OF THE INVENTION

The formulation according to the invention is of the type comprising a monomeric acrylic phase consisting, by weight, of 50 to 100 % of one or more multiacrylic esters and of 50 to 0 % of at least one unsaturated monomer chosen from monoacrylic monomers and nonacrylic unsaturated monomers capable of being polymerized by a radical route and a free-radical generating system which is soluble in the monomeric acrylic phase and whose action generating free radicals is inhibited in the presence of oxygen, and it is characterized in that it additionally contains, in solution in the monomeric acrylic phase, an adjuvant for improving the impact and shear strength of the cured formulation, chosen from unreactive linear polyurethanes and crosslinked or uncrosslinked polyurethane networks formed in situ within the monomeric acrylic phase from a polyurethane precursor system dissolved in the said acrylic phase and comprising one or more polyfunctional isocyanates and one or more polyols, or/and a thermally stabilizing adjuvant consisting of at least one epoxy resin used in combination with a latent hardener for the said resin.

The presence, in the adhesive formulation, of the crosslinked or uncrosslinked polyurethane or of the epoxy resin used in combination with the latent hardener or else of both these components, leads, when the adhesive is curing, to the formation of an acrylic network made up of the polymer chains resulting from the polymerization of the monomer(s) of the acrylic phase, within which there are present crosslinked or uncrosslinked polyurethane chains or a crosslinked polyepoxide network, or both.

DETAILED DESCRIPTION OF THE INVENTION

The adhesive formulation in accordance with the invention exhibits an increased chemical stability, and hence the possibility of employing more active free-radical generating systems or else eliminating the polymerization inhibitors which in many cases constitute a hindrance in the envisaged applications. The presence of the polyurethane adjuvant results in a better flexibility of the cured adhesive joint, and this is reflected in improved shear tensile, peel or impact strengths of the said joint, while the incorporation of the epoxy resin used in combination with the latent hardener results in a substantial improvement in the stability of the adhesive joint at high temperatures. Lastly, the creation of the crosslinked polyurethane network in the adhesive formulation makes it possible to adjust the viscosity of the latter as needed.

When the acrylic adhesive formulation contains only the adjuvant of the polyurethane type, the corresponding weight percentages x of the monomeric acrylic phase and y of the polyurethane adjuvant in the combination of both these components are advantageously such that $99.8 \leq x \leq 35$ and $0.2 \leq y \leq 65$, and preferably such that $95 \leq x \leq 50$ and $5 \leq y \leq 50$.

When the acrylic adhesive formulation contains only the adjuvant of the epoxy resin type used in combination with its hardener, the corresponding weight percentages x of the monomeric acrylic phase and z of the epoxy adjuvant in the combination of both these components are advantageously such that $99.8 \leq x \leq 50$ and $0.2 \leq z \leq 50$, and preferably such that $95 \leq x \leq 70$ and $5 \leq z \leq 30$.

In the case of the adhesive formulations in accordance with the invention including both the adjuvant of the polyurethane type and the adjuvant of the epoxy type the corresponding weight percentages x of the monomeric acrylic phase, y of the polyurethane adjuvant and z of the adjuvant of the epoxy resin type in the combination of these three components of the formulation are advantageously such that $15 \leq x \leq 99.8$, $0.1 \leq y \leq 60$ and $0.1 \leq z \leq 90$ with $x+y+z=100$ %, and preferably such that $30 \leq x \leq 89$, $1 \leq y \leq 30$ and $10 \leq z \leq 70$ with $x+y+z=100$ %.

In the abovementioned formulation the percentage y represents either the percentage of preformed linear polyurethane or the percentage of the polyurethane precursor system.

The polyol(s) forming part of the composition of the polyurethane precursor system is(are) organic compounds which contain at least two hydroxyl groups in their molecules and have a number-average molecular mass of between 60 and 200,000. The said polyols may be especially polyetherpolyols resulting from the reaction of one or more polyols of low molecular mass, for example ethylene glycol, propylene glycol, butylene glycol, pentylene glycol, hexylene glycol, glycerol, trimethylolpropane, trimethylolethane, pentaerythritol, dipentaerythritol, methylglycoside, sorbitol and sucrose, with one or more epoxy compounds of the propylene oxide or ethylene oxide type or else polyester polyols resulting from the reaction of one or more micromolecular polyols of the abovementioned type with one or more polycarboxylic acids such as oxalic, malonic, succinic, glutaric, adipic, pimelic, suberic, azelaic, sebacic, malic, phthalic, cyclohexanedicarboxylic or endomethylenetetrahydrophthalic acids or anhydrides of such acids. It is also possible to employ polyols containing nitrogen or sulphur and especially polyester amides or polyether ester amides hydroxylated at chain ends or else alkylenediamines or polyalkylenepolyamines in which the hydrogen atoms attached to the nitrogen atoms are replaced by hydroxyalkyl residues such as, for example, hydroxyethyl or hydroxypropyl.

Polyetherdiols chosen from polyoxyalkylene glycols such as polyoxyethylene glycols, polyoxypropylene glycols, polyoxytetramethylene glycols, polyoxypentamethylene glycols and polyoxyhexamethylene glycols, which have a number molecular mass ($\overline{Mn}$) between 100 and 200,000, and preferably between 200 and 50,000 are very specially suitable as polyols, as also are aliphatic polyesterdiols such as alkylene glycol or oxyalkylene glycol polyadipates or polycaprolactones or aromatic polyesterdiols such as the polyterephthalates of alkylene glycols or of oxyalkylene glycols which have a number-average molecular mass of between 100 and 200,000 and preferably between 200 and 50,000.

To the abovementioned diols there may also be added polyols which have at least three hydroxyl groups in the molecule, for example trimethylolpropane, trimethylolethane or pentaerythritol, the said polyols being employed in an overall quantity representing not more than 60 % and preferably between 0.5 and 15 % of the weight of the said diols, these polyols acting as crosslinking agents.

The polyfunctional organic isocyanates, which are employed together with the polyols, are organic compounds containing at least two isocyanate functional groups in their molecule and which have a number molecular mass which is lower than 5,000. Such polyfunctional isocyanates may be acyclic or cyclic aliphatic isocyanates such as 1,6-diisocyanatohexane, isophorone diisocyanates, biuret triisocyanate, isophorone diisocyanate trimer, dimeryl diisocyanate, diisocyanatohexane trimer, 4,4,-diisocyanatodicyclohexylmethane, 1,3-bis-(isocyanatomethyl)cyclohexane, the methyl ester of 2,6-diisocyanatohexanoic acid or else aromatic isocyanates such as 2,4-diisocyanatotoluene, 2,6-diisocyanatotoluene, 1,5-diisocyanatonaphthalene, 4,4,-diisocyanatodiphenylmethane, 2,4,-diisocyanatodiphenylmethane, carbodiimidized or urethanized 4,4,-diisocyanatodiphenylmethane, triisocyanatotriphenylmethane, 2,4-diisocyanatotoluene trimer, 2,4-diisocyanatotoluene uretdione or 2,4-diisocyanatotolunesulphonic acids or isocyanate polymers derived from 4,4,-diisocyanatodiphenylmethane. The polyfunctional organic isocyanates which can be employed in accordance with the invention may also be chosen from isocyanate prepolymers resulting from the controlled reaction of an organic diisocyanate with a polyol, for example an adduct of a diisocyanatotoluene with trimethylolpropane.

When the polyurethane adjuvant consists of an unreactive linear polyurethane formed before its incorporation in the monomeric acrylic phase or of an uncrosslinked polyurethane formed in situ within the said phase from the polyurethane precursor system, these polyurethanes are obtained by reaction of one or more diols with one or more difunctional isocyanates, the said diol(s) and the said difunctional isocyanate(s) being advantageously chosen from the diols and diisocyanates referred to above.

When the polyurethane adjuvant consists of a crosslinked polyurethane formed in situ within the monomeric acrylic phase from the polyurethane precursor system, the said precursor system is made up of one or more polyfunctional isocyanates and of one or more polyols chosen from diols and mixtures of diols and of polyols containing at least three hydroxyl functional groups, so that this precursor system contains a suitable quantity of at least one isocyanate containing at least three isocyanate functional groups or/and at least one polyol containing at least three hydroxyl functional groups, in order that crosslinking of the polyurethane should take place without the appearance of phase separation. Thus, the crosslinked polyurethane precursor system can be formed by using one or more organic isocyanates consisting partly or wholly of one or more isocyanates containing at least three isocyanate functional groups in combination with one or more diols or with a mixture of one or more diols and of one or more polyols containing at least three hydroxyl functional groups, the quantity of the said at least trifunctional polyol(s) representing not more than 60 %, and preferably between 0.5 and 15 % of the overall weight of the diol(s) of the mixture.

The crosslinked polyurethane precursor system can also be formed by using one or more diisocyanates in combination with a mixture of one or more diols and of one or more polyols containing at least three hydroxyl functional groups, the overall quantity of the said at least trifunctional polyol(s) representing not more than 60 % and preferably between 0.5 and 15 % of the overall weight of the diol(s) of the mixture.

The corresponding proportions of the polyol(s) and of the polyfunctional isocyanate(s) to be employed to constitute the polyurethane precursor system correspond substantially to those ensuring a stoichiometry between the isocyanate groups and the hydroxyl groups, it being preferred to employ a slight excess of the polyisocyanate(s) in relation to stoichiometry, to prevent possible interfering secondary reactions with some acrylic monomers.

The epoxy resin present in the adhesive formulation in accordance with the invention may consist of a single epoxy resin or of a mixture of epoxy resins, chosen from the various known epoxy resins which contain at least two epoxide groups in their molecule. Examples of epoxy resins which can be employed in accordance with the invehtion are those such as the diglycidyl ether of 2,2-bis(4-hydroxyphenyl)propane, also called bisphenol A, the diglycidyl ether of tetrabromobisphenol A, the diglycidyl ether of bis(4-hydroxyphenyl)methane, also called bisphenol F, the triglycidyl ether of trihydroxyphenylmethane, the triglycidyl ether of para-aminophenol, the tetraglycidyl ether of methylenedianiline, the tetraglycidyl ether of tetraphenylolethane, the polyglycidyl ethers of phenol/formaldehyde resins, the polyglycidyl ethers of cresol/formaldehyde resins, polyepoxidized resins of the epoxyhydantoin or epoxycyanurate type, epoxidized polyoxypropylenes, glycidyl phthalates and cycloaliphatic epoxy resins.

As indicated above, the adhesive formulation contains a latent hardener for the epoxy resin, that is to say, according to the invention, a compound which is capable of crosslinking the epoxy resin when the temperature within the adhesive formulation exceeds a certain threshold, in particular has a value higher than 60° C. and preferably higher than 80° C., and which is substantially inactive within the composition when the temperature of the latter is below the said threshold. A description of the epoxy resin hardeners from which the latent hardener employed in the adhesive formulation according to the invention can be chosen is given, among others, in the books "Handbook of Epoxy Resins" by Lee and Neville (McGraw-Hill Publ. 1967), chapters 7 to 13 and 15-16, and "Epoxy Resins Chemistry and Technology" by May and Tanaka (Dekker Publ. 1973), pages 239 to 325. The preferred hardeners in accordance with the invention consist of aromatic diamines, especially bis(aminophenyl) sulphones such as bis(4-aminophenyl) sulphone and dicyandiamide. According to the invention, the epoxy resin hardener of the aromatic amine type may be prereacted with a part of the epoxy resin to form an adduct and the adduct thus obtained may be employed as a modified hardener.

The quantity of latent hardener of the aromatic diamine type present in the formulation advantageously represents 1 to 30 %, and preferably 5 to 15 %, of the weight of the epoxy resin.

To improve the activity of the abovementioned hardener, one or more catalysts may be added to the adhesive formulation, consisting in particular of Lewis acids, especially BF$_3$ and SnCl$_2$ or of complexes of such Lewis acids with amines such as monoethylamine (abbreviated to MEA), dimethylaniline, benzylamine, piperidine, or else with ethers such as dialkyl ethers like ethyl ether or methyl ether, or yet again with alcohols such as methanol, ethylene glycol, butylene glycol or diethylene glycol.

These compounds of the Lewis acid type may also be employed by themselves as hardeners for the epoxy resin, in a quantity ranging from 0.5 to 10 %, and preferably from 1 to 6 %, of the weight of this resin.

The multiacrylic esters, which constitute the major fraction of the monomeric acrylic phase, are polyfunctional acrylic esters containing in their molecule at least two groups of formula

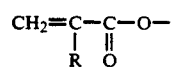

in which R denotes a hydrogen or chlorine atom or a C$_1$–C$_3$ alkyl radical, especially methyl.

Advantageously, the said multiacrylic esters correspond to the formula

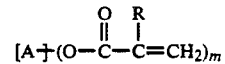

in which A denotes an m-valent organic radical containing from 2 to 50 carbon atoms, R has the abovementioned meaning and m is an integer equal to at least 2, and preferably ranging from 2 to 5.

In particular, the multiacrylic monomers may be chosen from:

the polyacrylic esters of polyols, which include especially alkylene diacrylates and dimethacrylates such as tetramethylene or hexamethylene diacrylates and dimethacrylates, polyoxyalkylene diacrylates and dimethacrylates such as diethylene glycol, triethylene glycol, tetraethylene glycol or dipropylene glycol diacrylates or dimethacrylates, triacrylates and trimethacrylates such as trimethylolpropane triacrylate or trimethacrylate, tetracrylates and tetramethacrylates such as diglycerol tetracrylate and tetramet.hacrylate or pentaerythritol tetracrylate and tetramethacrylate, and pentacrylates and pentamethacrylates such as those of pentaerythritolmonohydroxy;

prepolymer esters containing acrylic end groups prepared by treating with a hydroxyalkyl or aminoalkyl acrylate or methacrylate the reaction production of an excess of an isocyanate with a polyamine containing primary or secondary amine groups or a polyol; and monomers of the urethane/acrylate or ureide/acrylate type, resulting from the reaction of a polyisocyanate with an acrylic ester such as an acrylate or a methacrylate in which the ester residue contains a hydroxyl group or a primary or secondary amine group.

The preferred multiacrylic esters are the diacrylic esters corresponding to the formula

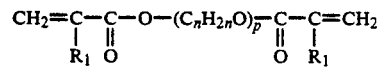

in which R is a hydrogen atom or a methyl radical, n is an integer ranging from 2 to 4 and preferably equal to 2 or 3, and p is an integer ranging from 2 to 12 and preferably taking the values from 2 to 8.

Examples of such esters are those such as triethylene glycol, tetraethylene glycol, pentamethylene glycol, hexamethylene glycol or dipropylene glycol diacrylates and dimethacrylates.

The monoacrylic monomers and the nonacrylic unsaturated monomers capable of being polymerized by a radical route which are capable of being used in combination with the multiacrylic esters must be compatible with the multiacrylic esters, that is to say miscible with the said esters, to form a homogeneous monomeric acrylic phase.

The monoacrylic monomers are, in particular, chosen from acrylic compounds of formula

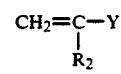

in which $R_2$ denotes a hydrogen atom or a $C_1$-$C_3$ alkyl radical and Y denotes a nitrile group or

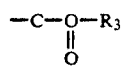

residue with $R_3$ denoting a radical chosen from monovalent radicals containing up to 12 carbon atoms and especially from $C_1$-$C_{12}$ alkyl, aminoalkyl, epoxyalkyl, hydroxyalkyl and chloroalkyl radicals, $C_4$-$C_{12}$ cycloalkyl or heterocyclic radicals and $C_2$-$C_{12}$ alkenyl radicals. Examples of these monomers are those such as isobutyl methacrylate, hexyl methacrylate, lauryl methacrylate, ethyl acrylate, isobutyl acrylate, 2-ethylhexyl acrylate, hydroxyethyl methacrylate, hydroxypropyl methacrylate, glycidyl methacrylate, hydroxyethyl acrylate, hydroxypropyl acrylate, acrylonitrile and methacrylonitrile.

Compounds such as, in particular, styrene, alphamethylstyrene, indene, divinylbenzene, vinylpyrrolidone and vinyl acetate may be mentioned among the nonacrylic unsaturated monomers.

When the monomeric acrylic phase contains one or more nonacrylic unsaturated monomers capable of being polymerized by a radical route, the overall proportion of the said unsaturated monomers in the said phase is preferably equal to at most 20 % of the overall weight of the various monomers which it contains.

Advantageously, the free-radical generating system consists of at least one peroxy compound which is soluble in the monomeric acrylic phase and whose free-radical generating action is inhibited by oxygen, or of a combination of a peroxy compound of this kind with one or more activators. The peroxy compound(s) of the free-radical generating system may consist especially of peroxides such as dialkyl peroxides, for example di-tert-butyl peroxides, dicumyl peroxides, lauroyl peroxide or more especially of hydroperoxides and of peroxy compounds capable of decomposing or hydrolysing to give hydroperoxides in situ. The peroxy compound of the free-radical generating system is preferably made up of one or more organic hydroperoxides corresponding to the formula $R_4OOH$, in which R. denotes a $C_2$-$C_{18}$ and preferably $C_3$-$C_{12}$ hydrocarbon radical, the said radical being optionally substituted by one or more functional groups without action on the hydroperoxide functional group, the radical $R_4$ being in particular an alkyl, aryl or aralkyl radical. Examples of such organic hydroperoxides are those such as cumene hydroperoxide, tert-butyl hydroperoxide, methyl ethyl ketone hydroperoxide, isopropyl hydroperoxide and cyclohexyl hydroperoxide.

In some cases it may be advantageous to employ hydroperoxides in combination with other peroxy compounds and especially with peroxides such as dialkyl peroxides.

The quantity of the free-radical generating system in the anaerobic adhesive formulation may vary quite widely depending on the nature of the said system and that of the monomers to be polymerized. When the free-radical generating system consists of one or more peroxy compounds or contains one or more of the said compounds, the total quantity of peroxy compounds in this system is less than 10 % and is preferably situated between 0.1 and 6 % of the weight of the monomers to be polymerized which are present in the formulation.

The activators capable of being used in combination with the peroxy compounds to form the free-radical generating system are especially tertiary amines in which the radicals attached to the nitrogen atom contain up to ten carbon atoms each and, in particular, trialkylamines such as triethylamine or tributylamine, or else N,N-dialkylarylamines such as N,N-dimethyl-para-toluidine, or else heterocyclic secondary amines, for example pyrrolidine, piperazine and 1,2,3,4-tetrahydroquinoline, or else organic sulphimides and, for example, saccharin, which are employed by themselves or in combination with heterocyclic secondary amines or N,N-dialkylarylamines, or else compounds such as succinimide, phthalimide and formamide. The quantity of activator may vary within wide limits. The total quantity of activator is advantageously less than 10 % and preferably between 0.05 % and 6 % of the weight of the monomers to be polymerized which are present in the anaerobic formulation.

Although the formulation in accordance with the invention exhibits good chemical stability, this stability can be improved further by incorporating polymerization inhibitors in the said formulation and, in particular, phenolic compounds such as 2,6-ditert-butyl-4-methylphenol, or else quinones or hydroquinones, in a quantity representing, for example, 10 to 10,000 ppm, and preferably 10 to 5,000 ppm.

To prevent the detrimental influence of metallic impurities which may be present in the ingredients making up the formulation or introduced during the preparation of the formulation in metallic mixing devices, on the storage stability of the anaerobic formulation, chelating agents capable of complexing the said metallic impurities may also be added to it. Chelating agents which are particularly suitable are $\alpha$-aminocarboxylates or aminocarboxylates such as the alkali metal salts of alkylenediaminetetracetic acids and especially the tetrasodium salt of ethylenediaminetetracetic acid, $\beta$-substituted hydroxyaryl compounds such as salicylaldehyde, orthoaminophenol, the disodium salt of pyrocatechol and the disodium salt of ortho-thiobenzoic acid, or else compounds such as bipyridyl, tripyridyl, 8-hydroxyquinoline, 1,10-phenanthroline and salicylaldoxime. The chelating agent is incorporated in the anaerobic formulation in a proportion of 10 to 3,000 ppm and preferably 50 to 1,000 ppm.

If need be, other ingredients capable of imparting desirable additional properties to the anaerobic adhesive formulation may also be incorporated in the said formulation, it being possible for such ingredients to include especially thickeners, plasticizers, colorants or thixotropic agents. The said ingredients are employed in quantities corresponding to those generally recommended in the art.

The anaerobic formulation in accordance with the invention always contains a certain quantity of dissolved oxygen and it is preferably saturated with oxygen.

The anaerobic formulation can be prepared by any mixing method which makes it possible to produce a homogeneous and stable mixture of the ingredients forming part of the composition of the said formulation.

The anaerobic adhesive formulation in accordance with the invention can be employed in the various applications of conventional anaerobic formulations. It may be employed, for example, for the production of assemblies and in particular for locking nuts or else for producing seals, or even for performing structural adhesive bonding by first of all producing a partial curing of the adhesive joint at an ambient or slightly elevated temperature, and then subjecting the partially cured adhesive joint to a postcure at a higher temperature.

The invention is illustrated by the following examples, which are given without any limitation being implied:

EXAMPLE 1

Six anaerobic adhesive formulations were prepared, whose compositions are given in parts by weight in Table I. One of the formulations, namely formulation A is a control formulation, while the others (formulations 1.1 to 1.5) are formulations in accordance with the invention.

TABLE I

| | Formulation | | | | | |
|---|---|---|---|---|---|---|
| | A | 1.1 | 1.2 | 1.3 | 1.4 | 1.5 |
| Triethylene glycol dimethacrylate | 97 | 87.3 | 77.6 | 67.9 | 58.2 | 48.5 |
| Linear polyurethane $\alpha$) | 0 | 10 | 20 | 30 | 40 | 50 |
| CHP $\beta$) | 3 | 2.7 | 2.4 | 2.2 | 1.8 | 1.5 |
| Saccharin | 0.3 | 0.27 | 0.24 | 0.21 | 0.18 | 0.15 |
| N,N-Dimethyl-para-toluidine | 0.3 | 0.27 | 0.24 | 0.21 | 0.18 | 0.15 |
| Hydroquinone (ppm) $\gamma$) | 1000 | 1000 | 1000 | 1000 | 1000 | 1000 |

$\alpha$) - Unreactive linear polyurethane prepared by polycondensation of 91.7 parts by weight of a polyetherdiol known under the name of P2000 and consisting of a polyoxypropylene glycol of Mn equal to 2000 with 8.3 parts by weight of toluene diisocyanate, the polyurethane formed being separated from the reaction mixture by precipitation.
$\beta$) - CHP: cumene hydroperoxide
$\gamma$) - The quantity of hydroquinone is expressed in ppm by weight relative to the total of the other ingredients of the formulation.

Preparation of the Control Formulation

First of all, air was bubbled through the dimethacrylate for one hour at ambient temperature and then, while the bubbling was continued and the operation was carried out with mechanical stirring at ambient temperature, thes accharin, N,N-dimethyl-para-toluidine, CHP and lastly hydroquinone were dissolved successively in the dimethacrylate, the hydroquinone being added in the form of a 10% solution in methanol.

Preparation of the Formulations in Accordance with the Invention

First of all, air was bubbled through the dimethacrylate for one hour at ambient temperature and then, while the air bubbling was continued and the operation was carried out with mechanical stirring, the linear polyurethane was first of all dissolved in the dimethacrylate at a temperature of about 50° C., followed successively at ambient temperature by the saccharin, N,N-dimethyl-para-toluidine, and CHP and lastly hydroquinone, the latter being added as a 10 % solution in methanol.

The adhesive formulations thus obtained were then subjected to various tests to determine the viscosity, the gel time and the setting time of each of the said formulations.

Determination of the Gel Time

In this test, a volume of adhesive formulation equal to 2 cm³ was placed in a test tube 125 mm in length and 15 mm in diameter. The tube was then closed and placed in a bath maintained at a constant temperature of 80° C.. The time elapsed between the instant when the test tube is placed in the bath and the instant when a beginning of gelling of the formulation contained in the tube is observed was noted and this time was taken as a measurement of the gel time, the said time giving a measurement of the stability of the formulation. A high gel time corresponds to a high stability of the adhesive formulation.

Determination of the Setting Time

In this test, several drops of the anaerobic formulation were placed on the threads of a steel bolt with an external thread diameter of 9.52 mm and comprising 24 threads per 2.54 cm, and of the corresponding nut, and these components were then assembled. The nut was moved slightly relative to the bolt at regular intervals to determine the instant when the polymerization took place. When it was no longer possible to rotate the nut by hand relative to the bolt, the total elapsed time was noted and this time was taken as a measurement of the setting time. This time is proportionally shorter the higher the rate of curing of the anaerobic formulation.

The anaerobic adhesive formulations were also employed to carry out, on the one hand, nut unlocking tests and, on the other hand, tests for adhesive bonding of steel sterigmata to evaluate the strength of the cured adhesive joint.

Nut Unlocking Test

A steel bolt with an external thread diameter of 9.52 mm and comprising 24 threads per 2.54 cm of length, and the corresponding nut, were employed. A few drops of the anaerobic formulation were placed on the threads of the bolt and of the nut and the said components were then assembled while ensuring that a sufficient quantity of liquid was present in the threads to produce a good seal. The bolt/nut assemblies were then subjected to a thermal treatment so as to cause the adhesive to cure.

At the end of the thermal treatment, the unlocking torque of the nut was measured by using a torque key.

Test on Adhesive Bonding of Steel Sterigmata

Assemblies consisting of two steel sterigmata were produced, each being 10 cm in length, 2.5 cm in width and 0.4 cm in thickness, these being adhesively bonded to each other by means of the chosen anaerobic formulation. To produce the said assemblies, one of the faces of a first sterigma, degreased with trichloroethylene, beforehand, was coated with a uniform layer of the anaerobic formulation and the face of a second sterigma, also degreased with trichloroethylene, was then applied onto the face of the first sterigma coated in this way, so as to form an assembly comprising an adhesive joint approximately 1.25 cm in length.

The assemblies obtained were then subjected to a thermal treatment, after which the shear strength of the adhesive joint was determined by subjecting the assemblies to a shear tensile test by following the specifications of ASTM standard D 1002-72. To carry out the shear tensile test, the speed of travel of the jaws of the tensometer was equal to 1.33 mm/minute.

The values of the various quantities measured are given in Table II, each representing an average value determined over ten tests.

On inspecting the results which appear in Table II it can be seen that the addition of an unreactive linear polyurethane to an anaerobic acrylic formulation makes it possible to vary the value of the unlocking torque of the bolt/nut assemblies. In addition, the shear strength of the cured adhesive joints containing a polyurethane of this kind is improved in the majority of cases, compared with that of the control.

TABLE II

| | Formulation | | | | | |
|---|---|---|---|---|---|---|
| | A | 1.1 | 1.2 | 1.3 | 1.4 | 1.5 |
| Viscosity at $10\ s^{-1}$ (Pa s) | 0.008 | 0.073 | 0.29 | 0.68 | 1.12 | 1.17 |
| Gel time at 80° C. (min) | 15 | 7 | 10 | 15 | 45 | 40 |
| Setting time (min) | 25 | 25 | 25 | 25 | 45 | 60 |
| Unlocking torque after thermal treatment (N m) | | | | | | |
| 24 h at ambient | 13 | 24 | 20 | 15 | 11 | 2 |
| 24 h at ambient + 1 h at 80° C. | 29 | 25 | 17 | 15 | 12 | 8 |
| 1 h at 80° C. + 1 h at 150° C. | 30 | 25 | 20 | 16 | 12 | 8 |
| 1 h at 80° C. + 1 h at 220° C. | 29 | 18 | 13 | 6 | 5 | 6 |
| Shear strength after thermal treatment (MPa) | | | | | | |
| 24 h at ambient | 1.7 | 1.6 | 2.6 | 2 | 0.6 | 0 |
| 24 h at ambient + 1 h at 80° C. | 1.9 | 1.5 | 2.2 | 3.1 | 2.6 | 1.9 |
| 1 h at 80° C. + 1 h at 150° C. | 2.3 | 1 | 6 | 4.5 | 3.6 | 3.3 |
| 1 h at 80° C. + 1 h at 220° C. | 1 | 2.3 | 1.5 | 2.2 | 0.7 | 0.9 |

EXAMPLE 2

Six anaerobic adhesive formulations were prepared, whose compositions are given in parts by weight in Table III. One of the formulations, namely formulation A is the control formulation whose preparation is given in Example 1, while the others (formulations 2.1 to 2.5) are formulations in accordance with the invention.

TABLE III

| | Formulation | | | | | |
|---|---|---|---|---|---|---|
| | A | 2.1 | 2.2 | 2.3 | 2.4 | 2.5 |
| Triethylene glycol dimethacrylate | 97 | 87.3 | 77.6 | 67.9 | 58.2 | 48.5 |
| Polyurethane precursors | | | | | | |
| Polyetherdiol P2000 | 0 | 7.75 | 15.5 | 23.25 | 31 | 38.75 |
| Polyfunctional isocyanate δ) | 0 | 2.95 | 5.9 | 8.85 | 11.8 | 14.75 |
| CHP | 3 | 2.7 | 2.4 | 2.1 | 1.8 | 1.5 |
| Saccharin | 0.3 | 0.27 | 0.24 | 0.21 | 0.18 | 0.15 |
| N,N-Dimethyl-para-toluidine | 0.3 | 0.27 | 0.24 | 0.21 | 0.18 | 0.15 |
| Hydroquinone (ppm) | 1000 | 1000 | 1000 | 1000 | 1000 | 1000 |

δ): Adduct of toluene diisocyanate and of trimethylolpropane marketed by Bayer under the name Desmodur L 75.

Preparation of the Formulations in Accordance with the Invention

First of all, air was bubbled through the dimethacrylate for one hour at ambient temperature and then, while the air bubbling was maintained and the mixture was stirred mechanically, the polyetherdiol and the polyfunctional isocyanate were successively added to the dimethacrylate and the whoel was homogeneized for 2 hours at ambient temperature and the homogenized mixture was then heated to 60° C. and this temperature was maintained for one hour to improve the formation of the polyurethane in situ. The saccharin, N,N-dimethyl-para-toluidine and CHP were then successively added at ambient temperature to the mixture thus obtained, followed by the hydroquinone, the latter being employed as a 10 % solution in methanol.

The adhesive formulations prepared were then subjected to various tests, as shown in Example 1 to determine the viscosity, the gel time and the setting time of the said formulations, together with the values of the unlocking torque and the shear strength of the cured adhesive joint.

The values of the various quantities measured are given in Table IV, each representing an average value over ten tests.

From an inspection of the results shown in Table IV it follows that the formation of the polyurethane within the adhesive formulation yields formulations which are more fluid than the formulations containing a preformed polyurethane and have a slightly longer gel time, together with higher values of the unlocking torque and of the shear strength.

TABLE IV

| | Formulation | | | | | |
|---|---|---|---|---|---|---|
| | A | 2.1 | 2.2 | 2.3 | 2.4 | 2.5 |
| Viscosity at $10\ s^{-1}$ (Pa s) | 0.009 | 0.02 | 0.032 | 0.036 | 0.051 | 0.27 |
| Gel time at 80° C. (min) | 15 | 20 | 15 | 45 | 60 | 80 |
| Setting time (min) | 25 | 25 | 25 | 25 | 15 | 50 |
| Unlocking torque after thermal treatment (N m) | | | | | | |
| 24 h at ambient | 13 | 32 | 18 | 18 | 13 | 7 |
| 24 h at ambient + 1 h at 80° C. | 29 | 30 | 18 | 25 | 11 | 7 |
| 1 h at 80° C. + 1 h at 150° C. | 30 | 42 | 17 | 24 | 10 | 6 |
| 1 h at 80° C. + 1 h at 220° C. | 29 | 18 | 16 | 17 | 6 | 4 |
| Shear strength after thermal treatment (MPa) | | | | | | |
| 24 h at ambient | 1.7 | 3 | 2.3 | 0.6 | | |
| 24 h at ambient + 1 h at 80° C. | 1.9 | 1.7 | 4.1 | 3.7 | 1.9 | 0.8 |
| 1 h at 80° C. + 1 h at 150° C. | 2.3 | 1.3 | 5.6 | 4.9 | 1.7 | 0.8 |
| 1 h at 80° C. + 1 h at 220° C. | 1 | 1.2 | 3.5 | 5 | 1 | 0.5 |

EXAMPLE 3

By operating in a manner similar to that described in Example 2, three anaerobic adhesive formulations in accordance with the invention were prepared, namely formulations 3.1 to 3.3, whose compositions are those of formulations 2.1 to 2.3 respectively, except that the formulations 3.1 to 3.3 are free from saccharin, N,N-dimethyl-para-toluidine and hydroquinone.

Using the anaerobic adhesive formulations thus obtained and operating as shown in Example 1, assemblies were formed from steel sterigmata and the said assemblies were subjected to a thermal treatment and then to a shear tensile test to determine the shear strength of the adhesive joint.

Formulation 3.2 was also employed for a test to determine the nut unlocking torque after thermal treatment as shown in Example 1.

The results obtained are assembled in Table V.

TABLE V

|  | Formulation | | |
|---|---|---|---|
|  | 3.1 | 3.2 | 3.3 |
| Shear strength after thermal treatment (MPa) | | | |
| 24 h at ambient | 4.2 | 4.9 | 4.5 |
| 24 h at ambient + 1 h at 80° C. | 4.2 | 7.9 | 7.8 |
| 1 h at 80° C. + 1 h at 150° C. | 9.6 | 13.4 | 13 |
| Unlocking torque after thermal treatment (N m) | | | |
| 24 h at ambient |  | 20 |  |
| 24 h at ambient + 1 h at 80° C. |  | 20 |  |
| 1 h at 80° C. + 1 h at 150° C. |  | 26 |  |

EXAMPLE 4

By operating in a manner similar to that described in Example 2, three anaerobic adhesive formulations in accordance with the invention were prepared, namely formulations 4.1 to 4.3, whose compositions are thos eof formulations 2.1 to 2.3 respectively, except that formulations 4.1 to 4.3 contained only 200 ppm of hydroquinone and that the dimethacrylate employed was tetraethylene glycol dimethacrylate.

The adhesive formulations thus obtained were subjected to tests as indicated in Example 1, to determine the gel time and the setting time of each of the said formulatiosn and also to the test to determine the unlocking torque of bolt/nut systems assembled by means of these formulations.

The results obtained, which are averages over ten tests, are assembled in Table VI.

On comapring the results shown in Tables IV and VI it cna be seen that tetraethylene glycol dimethacrylate gives anaerobic adhesive formulatiosn which are chemically more stable and more advantageous with regard to mechanical properties than those making use of triethylene glycol dimethacrylate.

TABLE VI

|  | Formulation | | |
|---|---|---|---|
|  | 4.1 | 4.2 | 4.3 |
| Gel time at 80° C. (min) | 25 | 50 | 65 |
| Setting time (min) | 10 | 12 | 13 |
| Unlocking torque after thermal treatment (N m) | | | |
| 24 h at ambient | 33 | 23 | 25 |
| 24 h at ambient + 1 h at 80° C. | 40 | 28 |  |
| 1 h at 80° C. + 1 h at 150° C. | 35 | 23 |  |
| 1 h at 80° C. + 1 h at 220° C. | 18 | 21 |  |

EXAMPLE 5

Three anaerobic adhesive formulations in accordance with the invention were prepared, namely formualtions 5.1 to 5.3, whose compositions in parts by weight are given in Table VII.

TABLE VII

|  | Formulation | | |
|---|---|---|---|
|  | 5.1 | 5.2 | 5.3 |
| Triethylene glycol dimethacrylate | 87.3 | 77.6 | 87.3 |
| CHP | 2.7 | 2.4 | 2.7 |
| Saccharin | 0.27 | 0.24 | 0.27 |
| N,N-Dimethyl-para-toluidine | 0.27 | 0.24 | 0.27 |
| Epoxy resin (BADGE)$^{e)}$ | 10 | 20 | 10 |
| Bis(4-aminophenyl) sulphone | 1 | 2 | 1 |
| BF$_3$.MEA$^{\lambda)}$ | 0.01 | 0.02 | 0.01 |
| Hydroquinone (ppm) | 200 | 200 | 1000 |

$^{e)}$ - BADGE = bisphenol A diglycidyl ether
$^{\lambda)}$ - BF$_3$.MEA = BF$_3$-monoethylamine complex Preparation of the Adhesive Formulatsion First of all, a solution of bis(4-aminophenyl) sulphone, abbreviated to DDS, and of the BF$_3$.MEA complex in the epoxy resin was prepared. To do this, DDS was dissolved in the epoxy resin, kept stirred at a temperature of approximately 110° C., and the solution thus obtained was then cooled to approximately 85° C. and the BF$_3$.MEA complex was then incorporated in it.

Separately, air was bubbled through the dimethacrylate for one hour at ambient temperature and then, while the air bubbling was continued and the mixture was stirred mechanically, the temperature of the latter was raised to approximately 65° C. and while the said temperature was maintained the epoxy resin containing DDS and the BF$_3$.MEA complex in solution was incorporated in it. The solution formed was then cooled to a temperature close to the ambient and the saccharin, N,N-dimethyl-para-toluidine and CHP were then successively incorporated in it with stirring and bubbling of air, followed by the hydroquinone in the form of a 10 % solution in methanol.

The anaerobic adhesive formulations thus obtained were subjected to tests, as shown in Example 1, to determine the gel time and the setting time of each of the said formulations and, furthermore, the unlocking torque of bolt/nut systems assembled by means of these formulations, together with the shear strength of the cured adhesive joint after thermal treatment.

The results obtained, which represent averages over ten tests, are listed in Table VIII.

TABLE VIII

|  | Formulation | | |
|---|---|---|---|
|  | 5.1 | 5.2 | 5.3 |
| Gel time | | | |
| at 80° C. | 6 min | 7 min | 30 min. |
| at 25° C. | several months | several months | several months |
| Setting time (min) | 5 | 8 | 25 |
| Unlocking torque after thermal treatment (N m) | | | |
| 24 h at ambient | 40 | 28 |  |
| 24 h at ambient + 1 h at 80° C. | 38 | 30 |  |
| 1 h at 80° C. + 1 h at 150° C. | 42 | 32 |  |
| 1 h at 80° C. + 1 h at 220° C. | 54.5 | 45 |  |
| Shear strength after thermal treatment (MPa) | | | |
| 24 h at ambient | 2.2 | 1.7 |  |
| 24 h at ambient + 1 h at 80° C. | 1.6 | 1.6 |  |
| 1 h at 80° C. + | 2.2 | 2.3 |  |

TABLE VIII-continued

|  | Formulation | | |
|---|---|---|---|
|  | 5.1 | 5.2 | 5.3 |
| 1 h at 150° C. |  |  |  |
| 1 h at 80° C. + |  | 4.7 | 3.7 |
| 1 h at 220° C. |  |  |  |

Comparison of the results of Table VIII with those obtained with the control formulation A shows that the creation of a three-dimensional polyepoxide network within the acrylic adhesive joint results in higher values of the unlocking torque and in an improved thermal stability of the cured adhesive joint.

EXAMPLE 6

Four anaerobic adhesive formulations in accordance with the invention were prepared, namely formulations 6.1 to 6.4, whose compositions in parts by weight are given in Table IX.

TABLE IX

|  | Formulation | | | |
|---|---|---|---|---|
|  | 6.1 | 6.2 | 6.3 | 6.4 |
| Triethylene glycol dimethacrylate | 48.5 | 58.2 | 72.2 | 63.05 |
| Polyurethane precursors |  |  |  |  |
| Polyetherdiol P2000 | 7.75 | 12.9 | 5.8 | 11.6 |
| Desmodur L 75 isocyanate | 2.95 | 2.95 | 2.2 | 4.4 |
| CHP | 1.5 | 1.8 | 2.25 | 1.95 |
| Saccharin | 0.15 | 0.18 | 0.225 | 0.195 |
| N,N-Dimethyl-para-toluidine | 0.15 | 0.18 | 0.225 | 0.195 |
| Epoxy resin (BADGE) | 40 | 30 | 17.5 | 20 |
| DDS | 4 | 3 | 1.75 | 2 |
| BF$_3$.MEA | 0.4 | 0.3 | 0.175 | 0.2 |
| Hydroquinone (ppm) | 200 | 200 |  |  |

Preparation of the Adhesive Formulations

First of all, a solution of DDS and of the BF$_3$.MEA complex in the epoxy resin was prepared as shown in Example 5.

Separately, air was bubbled through the dimethacrylate for one hour at ambient temperature and then, while the air bubbling was continued and the mixture was stirred mechanically, the polyetherdiol was added to the dimethacrylate, followed by the isocyanate, and the whole was homogenized for 2 hours at ambient temperature and the homogenized mixture was then heated to approximately 65° C. and this temperature was maintained for one hour to improve the formation of the polyurethane network in situ. The epoxy resin containing the DDS and the BF$_3$.MEA complex in solution incorporated in the mixture obtained, still maintained at a temperature of approximately 65° C. and with stirring and bubbling of air. The mixture thus produced was then returned to ambient temperature and the saccharin, N,N-dimethyl-para-toluidine and CHP were then successively added to it, followed by the hydroquinone as a 10 % solution in methanol.

The anaerobic formulations thus prepared were subjected to tests, as shown in Example 1, to determine the gel time and the setting time of each of the said formulations and, furthermore, the unlocking torque of bolt/nut systems assembled by means of these formulations, together with the shear strength of the cured adhesive joint after thermal treatment.

The results obtained, which are averages over ten tests, are assembled in Table X.

TABLE X

|  | Formulation | | | |
|---|---|---|---|---|
|  | 6.1 | 6.2 | 6.3 | 6.4 |
| Gel time at 80° C. (min) | 240 | 180 | 180 | 180 |
| Setting time (min) | 90 | 45 | 13 | 23 |
| Unlocking torque after thermal treatment (N m) |  |  |  |  |
| 24 h at ambient | 12 | 22 | 30 | 23 |
| 24 h at ambient + 1 h at 80° C. | 15 | 30 | 38 | 28 |
| 1 h at 80° C. + 1 h at 150° C. | 35 | 33 | 41 | 40 |
| 1 h at 80° C. + 1 h at 220° C. | 51 | 42 | 49 | 43 |
| Shear strength after thermal treatment (MPa) |  |  |  |  |
| 24 h at ambient | 1.8 | 2.9 | 3.8 | 5.6 |
| 24 h at ambient + 1 h at 80° C. | 5.3 | 5.5 | 3.1 | 6.8 |
| 1 h at 80° C. + 1 h at 150° C. | 12.7 | 8 | 2.6 | 7.8 |
| 1 h at 80° C. + 1 h at 220° C. | 16 | 7.5 | 2.5 | 5.1 |

On inspecting the results in Table X it appears that the creation of a polyurethane network and of a three-dimensional polyepoxide network within the acrylic joint makes it possible not only to obtain an adhesive joint exhibiting good thermal stability, but also to expect good mechanical performance in respect of thread locking and at the same time, in some cases (formulation 6.1), with regard to the assemblies of structural elements.

EXAMPLE 7

Formulations 6.1 and 6.3 were evaluated again after being kept for 15 days in the dark to determine the influence of ageing on the said formulations.

The results of nut unlocking and shear tensile tests performed with the use of the aged formulations are given in Table XI.

The results listed in Table XI demonstrate that the formulations have not changed with respect to the crosslinking and that, in addition, there is a significant improvement in the mechanical characteristics of the adhesive joints resulting from the aged formulations.

TABLE XI

|  | Formulation | |
|---|---|---|
|  | 6.1 aged | 6.3 aged |
| Unlocking torque after thermal treatment (N m) |  |  |
| 24 h at ambient | 8 | 18.7 |
| 24 h at ambient + 1 h at 80° C. | 18 | 40 |
| 1 h at 80° C. + 1 h at 150° C. | 70 | 44 |
| 1 h at 80° C. + 1 h at 220° C. | 67 | 54 |
| Shear strength after thermal treatment (MPa) |  |  |
| 24 h at ambient | 1 | 1.9 |
| 24 h at ambient + 1 h at 80° C. | 5.9 | 3.2 |
| 1 h at 80° C. + 1 h at 150° C. | 14 | 14 |
| 1 h at 80° C. + 1 h at 220° C. | 16 | 15.5 |

EXAMPLE 8

By operating in a manner similar to that described in Example 6, an anaerobic adhesive formulation in accordance with the invention was prepared, namely formulation 8.1, whose composition corresponded to that of formulation 6.1, except that formulation 8.1 did not contain hydroquinone.

The adhesive formulation thus obtained was subjected to tests, as shown in Example 1, to determine, on the one hand, the gel time and the setting time of the formulation and, on the other hand, the unlocking torque of bolt/nut systems assembled by means of this formulation, together with the shear strength of the adhesive joint after thermal treatment.

The results obtained, which represent averages over ten tests, are given in Table XII.

TABLE XII

|  | Formulation 8.1 |
|---|---|
| Gel time at 80° C. (min) | 240 |
| Setting time (min) | 40 |
| Unlocking torque after thermal treatment (N m) | |
| 24 h at ambient | 12 |
| 24 h at ambient + 1 h at 80° C. | 18 |
| 1 h at 80° C. + 1 h at 150° C. | 27 |
| 1 h at 80° C. + 1 h at 220° C. | 46 |
| Shear strength after thermal treatment (MPa) | |
| 24 h at ambient | 3.7 |
| 24 h at ambient + 1 h at 80° C. | 5.2 |
| 1 h at 80° C. + 1 h at 150° C. | 8 |
| 1 h at 80° C. + 1 h at 220° C. | 10 |

I claim:

1. A single component anaerobic acrylic adhesive formulation, which is chemically stable and capable of producing a cured adhesive joint exhibiting improved imapct and shear strengths and a good thermal bahvior, said formulation comprising:
   (a) a monomeric acrylic phase comprising, by weight, 50 to 100% of at least one multiacrylic ester selected from the group consisting of polyfunctional acrylic esters containing at least two groups of the formula

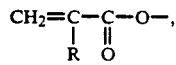

wherein R is a hydrogen or chlorine atom or a $C_1$-$C_3$ alkyl radical, and 50 to 0% of at least one unsaturated monomer selected from the group consisting of monacrylic monomers and non-acrylic unsaturated monomers capable of being polymerized by a radical route,
   (b) a free radical generating system which is soluble in the monomeric acrylic phase and whose action generating free radicals is inhibited in the presence of oxygen,
   (c) an adjuvant for improving the impact and shear strength of the cured formulation, said adjuvant being in solution in the monomeric acrylic phase and consisting of a cross-linked polyurethane network formed in situ within the monomeric acrylic phase from a polyurethane precursor system made up of one or more organic polyfunctional isocyanates and of one or more polyols selected from the groups consisting of diols and mixtures of diols and of polyols containing at least three hydroxyl functional groups, wherein the precursor system contains at least one isocyanate containing at least three isocyanate functional groups or at least one polyol containing at least three hydroxy functional groups or a mixture thereof in an amount so sleected that cross-linking of the polyurethane takes place without the appearance of phase separation in the formulation,
   (d) a thermally stabile adjuvant soluble in the monomeric acrylic phase and consisting of one or more epoxy resins containing at least two epoxy groups, and
   (e) a latent hardener for said resin or resins which is soluble in the monomeric acrylic phase.

2. The adhesive formulation according to claim 1, wherein the polyols forming part of the polyurethane precursor system have number-average molecular weights of between 60 and 200,000.

3. The adhesive formulation according to claim 1, wherein the polyfunctional isocyanates used in combination with he polyols to form the polyurethane precursor system have a molecular weight of less than 5,000.

4. The adhesive formulation according to claim 3, wherein said polyfunctional isocyanates are selected from the group consisting of acyclic aliphatic isocyanates, cyclic aliphatic isocyanates and aromatic isocyanates.

5. The adhesive formulation according to claim 1, wherein the quantity of said at least one polyol containing at least three hydroxy functional groups in the polyurethane precursor system represents not more than 60% of the weight of the diols present in said system.

6. The adhesive formulation according to claim 5, wherein said quantity is between 0.5 and 15% of the weight of the diols present in the polyurethane precursor system.

7. The adhesive formulation according to claim 1, wherein the diols present in the polyurethane precursor system are selected from the group consisting of polyetherdiols and polyesterdiols having number-average moelcular weights between 100 and 200,000.

8. The adhesive formulation according to claim 7, wherein said diols have number-average molecular weights between 200 and 50,000.

9. The adhesive formulation according to claim 1, wherein the weight percentages x of the monomeric acrylic phase, y of the polyurethane adjuvant, and z of the adjuvant of the epoxy resin type are such that $15 \leq x \leq 99.8$, $0.1 \leq y \leq 60$, and $0.1 \leq z \leq 90$ with $x+y+z=100\%$.

10. The adhesive formulation according to claim 9, wherein said weight percentages are such that $30 \leq x \leq 89$, $1 \leq y \leq 30$, and $10 \leq z \leq 70$ with $x+y+z=100\%$.

11. The adhesive formulation according to claim 1, wherein the epoxy resin is selected from the group consisting of the diglycidyl ether of 2,2-bis(4-hydroxyphenyl)propane, the diglycidyl ether of bis(4-hydroxyphenyl)methane, the diglycidyl ether of tetrabrominated 2,2-bis(4-hydroxyphenyl)propane, the triglycidyl ether of trihydroxyphenylmethane, the triglycidyl ether of paraaminophenol, the tetraglycidyl ether of methlenedianiline, the tetraglycidyl ether of tetraphenylolethane, the polyglycidyl ethers of phenol/formaldehyde resins, the polyglycidyl ethers of cresol/formaldehyde resins, polyepoxidized resins of the epoxyhydantoin or epoxycyanurate type, epoxidized polyoxypropylenes, glycidyl phthalates and cycloaliphatic epoxy resins.

12. The adhesive formulation according to claim 1, wherein the latent hardener for the epoxy resin is selected from the group consisting of aromatic diamines and dicyandiamide.

13. The adhesive formulation according to claim 12, wherein the latent hardener for the epoxy resin i selected from the group consisting of bis(aminophenyl)-sulphones.

14. The adhesive formulation according to claim 12, wherein the quantity of said latent hardener represents 1 to 30% of the weight of the epoxy resin.

15. The adhesive formulation according to claim 14, wherein said quantity represents 5 to 15% of the weight of the epoxy resin.

16. The adhesive formulation according to claim 12, wherein the latent hardener for the epoxy resin is employed in combination with a catalyst selected from the group consisting of Lewis acids and complexes of Lewis acids with amines, ethers or alcohols.

17. The adhesive formulation according to claim 1, wherein the hardener for the epoxy resin is a compound of the Lewis acid type, said compound being used in a quantity of from 0.5 to 10% by weight of the epoxy resin.

18. The adhesive formulation according to claim 17, wherein said quantity of hardener is from 1 to 6% by weight of the epoxy resin.

19. The adhesive formulation according to claim 1, wherein the multiacrylic esters present in the formulation correspond to the formula:

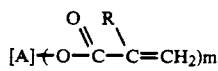

in which A is an m-valent organic radical containing from 2 to 50 carbon atoms, R is a hydrogen or chlorine atom or a $C_1$-$C_3$ alkyl radial, and m is an integer of from 2 to 5.

20. The adhesive formulation according to claim 1, wherein the multacrylic esters present in the formulation are diacrylic esters of the formula:

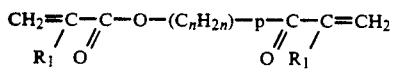

in which $R_1$ isa hydrogen atom or a methyl radical, n is an integer of from 2 to 4, and p is an integer of from 2 to 12.

21. The adhesive formulation according to claim 20, wherein n is 2 or 3.

22. The adhesive formulation according to claim 20, wherein p is from 2 to 8.

23. The adhesive formulation according to claim 1, wherein the free-radical generating system consists of at least one peroxy compound which is soluble in the monomeric acrylic phase and whose free-radical generating action is inhibited by oxygen, or a combination of said peroxy compound, with at least one activator.

24. The adhesive formulation according to claim 23, wherein the peroxy compound is a hydroperoxide or a compound capable of decomposing or hydrolyzing in situ to give a hydroperoxide.

25. The adhesive formulation according to claim 24, wherein the hydroperoixde has the formula $R_4OOH$, in which $R_4$ is $C_2$-$C_{18}$ hydrocarbon radical or a $C_{12}$-$C_{18}$ hydrocarbon radical substituted by one or mroe functional groups without action on the hydroperoxide functional group.

26. The adhesive formulation according to claim 25, wherein said hydrocarbon radical or substituted hydrocarbon radical contains from 3 to 12 carbon atoms.

27. The adhesive formulation according to claim 25, wherein the radical $R_4$ is selected from the group consisting of an alkyl, aryl and aralkyl radical.

28. The adhesive formulation according to claim 23, wherein the overall quantity of peroxy compounds represents less than 10% of the weight of the monomers to be polymerized which are present in the formulation.

29. The adhesive formulation according to claim 28, wherein said overall quantity is from 0.1 to 6% of said weight.

30. The adhesive formulation according to claim 23, wherein the activator used in combination with the peroxy compounds in the free-radical generating system is selected from the group consisting of succinimide, phthalimide, formamide, tertiary amines in which the radicals attached to the ntirogen contain up to 10 carbon atoms, heterocyclic secondary amines, organic sulphimides alone or in combination with heterocyclic secondary amines or N,N-dialkylarylamines.

31. The adhesive formulation according to claim 30, wherein said tertiary amines used in combination with the peroxy compounds in the free-radical generating system are trialkylamines or dialkylarylamines.

32. The adhesive formulation according to claim 30, wherein the total quantity of activator is less than 10% of the weight of the monomers to be polymerized which are present in the formulation.

33. The adhesive formulation according to claim 32, wherein said total quantity of activator is from 0.05% to 6% of said weight.

34. The adhesive formulation according to claim 1, further comprising at least oen additive selected from the group consisting of chelating agents for metallic impurities, polymerization inhibitors, plasticizers, thickeners, colorants and thixotropic agents.

35. The adhesive formulation according to claim 1, further comprising dissolved oxygen.

36. The adhesive formulation according to claim 1, further comprising a saturating amount of oxygen.

37. A method of adhering substrates together comprising administering an effective amount of the adhesive formulation of claim 1 to one or both of the substrates and bringing the substrates together to form an anaerobic adhesive bond therebetween.

* * * * *